United States Patent
Kobayashi et al.

(10) Patent No.: US 6,464,861 B1
(45) Date of Patent: Oct. 15, 2002

(54) APPARATUS FOR TREATING FLORA AND FAUNA WASTE WITH HYDROTHERMAL REACTION

(75) Inventors: Makoto Kobayashi, Shiki; Fumihiko Tamamushi, Yokohama; Sugihiro Konishi, Niiza; Kouji Takewaki, Yokohama, all of (JP)

(73) Assignee: Ishikawajima-Harima Heavy Industries Co., Ltd., Tokyo (JP)

( * ) Notice: Subject to any disclaimer, the term of this patent is extended or adjusted under 35 U.S.C. 154(b) by 0 days.

(21) Appl. No.: 09/714,421

(22) Filed: Nov. 16, 2000

(30) Foreign Application Priority Data

Nov. 1, 1999 (JP) .......................................... 11-330000

(51) Int. Cl.$^7$ .......................... B01D 17/12; C02F 1/02; C02F 1/20
(52) U.S. Cl. ........................ 210/137; 210/177; 210/180; 210/188; 210/195.1; 210/202; 210/259; 210/761; 96/155; 96/218; 422/198; 422/208
(58) Field of Search ................................. 210/101, 137, 210/177, 180, 182, 188, 195.1, 202, 258, 259, 631, 669, 752, 757, 758, 761, 762, 774, 805, 806, 97, 175; 422/198, 200, 201, 202, 203, 208

(56) References Cited

U.S. PATENT DOCUMENTS 5,292,442 A * 3/1994 Khan et al.
5,454,950 A * 10/1995 Li et al.
5,587,839 A * 12/1996 McGuinness ................ 210/761

FOREIGN PATENT DOCUMENTS

EP          0814061 A2      6/1997
JP          10-328699       12/1998

OTHER PUBLICATIONS

P.A. Marrone et al., "Product distribution and reaction pathways for methylene chloride hydrolysis and oxidation under hydrothermal conditions", Journal of Supercritical Fluids 12, 1998, pp. 239–254.

* cited by examiner

Primary Examiner—Joseph W. Drodge
(74) Attorney, Agent, or Firm—McCormick, Paulding & Huber LLP

(57) ABSTRACT

An arrangement for treating flora and fauna waste such as garbage under subcritical pressure and temperature. A slurry preparation unit (10) mixes the flora and fauna waste (11) with water (12) and sodium hydroxide (13) to prepare a slurry. A diaphragm pump (16) then pressurizes the slurry to subcritical pressure of water (20 Mpa). Subsequently, a hydrothermal reaction tube (25) heats the pressurized slurry to cause hydrothermal reaction in a subcritical condition thereby obtaining dissolved waste. The dissolved waste is depressurized and fed to an oxidization unit (22) for oxidation.

14 Claims, 1 Drawing Sheet

APPARATUS FOR TREATING FLORA AND FAUNA WASTE WITH HYDROTHERMAL REACTION

BACKGROUND OF THE INVENTION

1. Field of the Invention

The present invention generally relates to an arrangement for treating flora and fauna waste, and more particularly to such an arrangement that treats the garbage by hydrothermal reaction under a subcritical condition.

2. Description of the Related Art

Conventionally, flora and fauna waste such as garbage is collected by vehicles and carried to a particular place so that it is incinerated in a waste disposal facility, buried in the ground or used in reclamation by specialists. In recent years, however, various machines for treating the garbage were developed.

For example, Japanese patent Application, Laid Open publication No. 10-328699 entitled "SUPERCRITICAL HYDROXYLATION REACTOR"published Dec. 15, 1998 discloses an apparatus for oxidizing and dissolving organic waste containing water by supercritical hydroxylation reaction. Specifically, organic sludge is pressurized to more than a supercritical pressure of water (22 Mpa) together with oxygen, and heated to more than a supercritical temperature (374° C.). Then, the organic sludge is fed into a reactor for dissolving. At the same time, the oxygen mixed in the organic waste oxidizes the dissolved substances inside the reactor.

However, the above described dissolving and oxidizing method and apparatus requires severe conditions such as supercritical pressure and temperature so that piping and associated parts likely corrode.

Since the dissolving and oxidization take place under the pressure of 22 Mpa or more and the oxidization proceeds simultaneously in the reactor, the temperature rises to about 600° C. Thus, the apparatus should be made from a material which is resistive to such high pressure and temperature. In addition, that material must be resistant to the oxidization atmosphere.

Moreover, the organic waste has high viscosity so that it is difficult to continuously pressurize the waste to 22 Mpa or more by a plunger pump or the like.

SUMMARY OF THE INVENTION

One of the objects of the present invention is to a waste treating apparatus that can overcome the above described problems. Specifically, the present invention aims to maintain a dissolving capability of a waste treating apparatus while not subjecting the piping to corrosion.

According to one aspect of the present invention, there is provided an apparatus for treating flora and fauna waste, including a preparation unit for mixing the flora and fauna waste with water and chemicals to prepare a starting material (i.e., slurry), a pressuring unit for pressuring the slurry to subcritical pressure of water, a hydrothermal reaction unit for heating the pressurized slurry to cause hydrothermal reaction in a subcritical condition thereby obtaining dissolved waste, and an oxidization unit for oxidizing the dissolved waste after pressure reduction. In the present invention, therefore, the flora and fauna waste undergo the two processes, i.e., the hydrothermal reaction under the subcritical condition, and the oxidation. Thus, the flora and fauna waste can be disposed as sewage. Further, dioxins and other harmful gas are not generated.

The hydrothermal reaction unit may include a hydrothermal reaction tube and a heat medium circuit for heating the hydrothermal reaction tube. The hydrothermal reaction unit may further include a circulation mechanism, which connects an outlet of the hydrothermal reaction tube to an inlet of the reaction tube, for circulating the slurry to the reaction tube. The hydrothermal reaction unit may further include a heat exchanger for heat exchange between the slurry directed to the hydrothermal reaction tube and the dissolved waste directed to the oxidation unit.

The pressurizing unit may include a diaphragm pump for pressurizing the slurry to 6 Mpa or more, which is a subcritical pressure of water.

The oxidation unit may include an oxidation vessel for receiving the dissolved waste from the hydrothermal reaction unit after the dissolved waste is depressurized, and an oxygen supply unit for feeding an oxidizing agent such as air or oxygen to the oxidation vessel such that organic components such as hydrocarbon contained in and associated with the dissolved waste are deconstructed in the oxidation vessel for oxidation.

The oxidation unit may further include a gas-liquid separator located downstream of the oxidation vessel for separating the oxidized waste to a gas component and a liquid component, and a return line for returning the liquid component to the oxidation vessel.

DETAILED DESCRIPTION OF THE INVENTION

Figure 1:
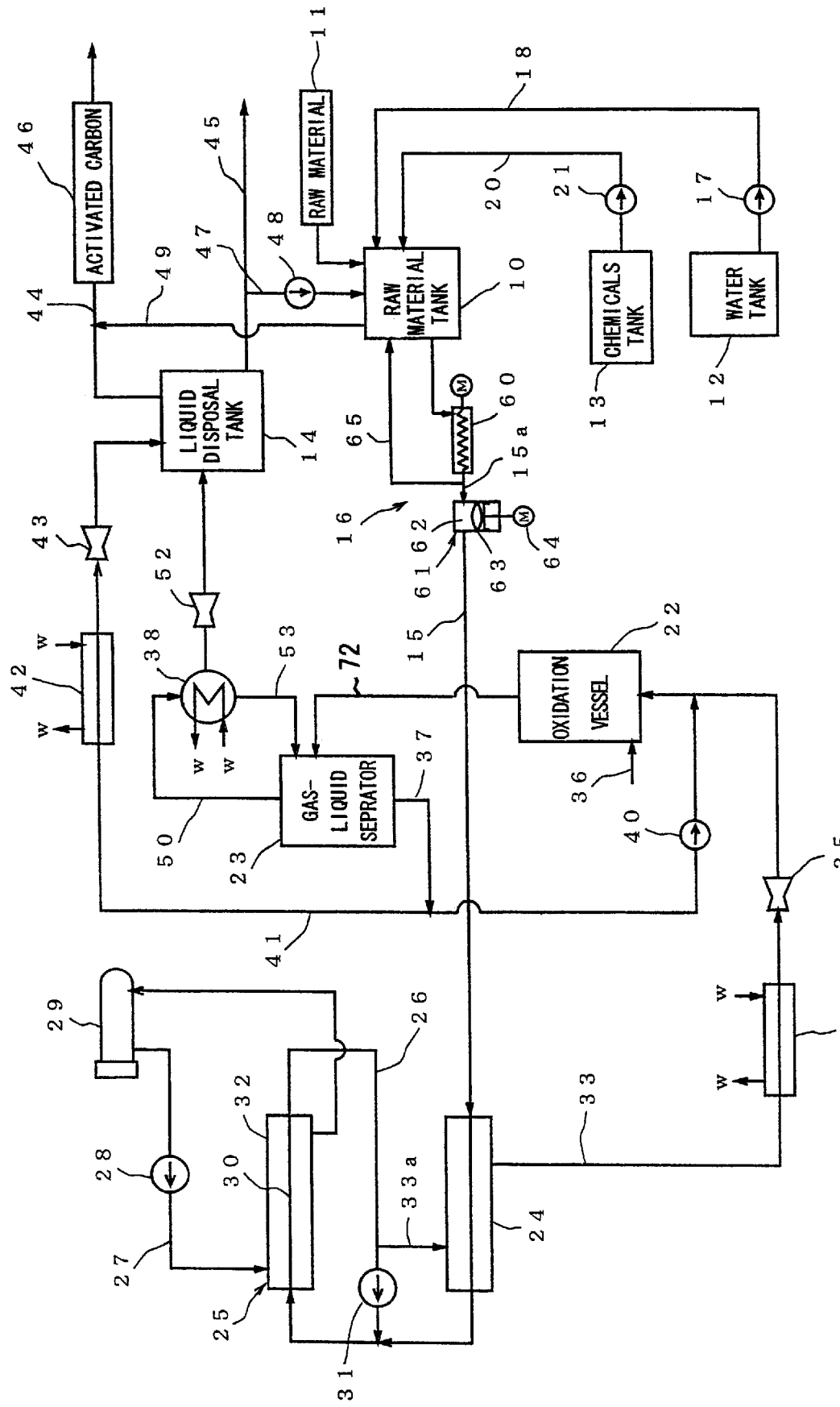
FIG. 1 illustrates a system diagram of a waste treating apparatus according to the present invention.

Now, an embodiment of the present invention will be described in reference to the accompanying drawing.

Referring to FIG. 1, a tank 10 is provided for receiving a raw material (flora and fauna waste) 11 such as food residue. Water is fed from a water tank 12, and used for hydrothermal reaction with subcritical water (will be described later). A chemicals tank 13 holds sodium hydroxide or the like and supplies it to the tank 10.

A slurry feed line 15 extends from the raw material tank 10, and a pressurization unit 16 is provided on the material feed line 15.

A water pipe 18 extends from the water tank 12 to the raw material tank 10 and the water tank 12 has a water pump 17 such that water is fed to the raw material tank 10 through the water pipe 18.

Likewise, a chemicals pipe 20 extends from the chemicals tank 13 to the raw material tank 10 and the chemicals tank 13 is equipped with a feed pump 21 such that chemicals are fed to the raw material tank 10 through the chemicals pipe 20.

The pressurizing unit 16 includes a feeder 60 such as single shaft axial screw type pump with a motor for continuously feeding the slurry to subsequent units from the raw material tank 10, and a diaphragm pump 61 for pressurizing the slurry, coming from the feeder 60, to a subcritical pressure (6 Mpa or more).

The diaphragm pump 61 has a cylinder chamber 62 equipped with check valves (not shown) at its inlet and outlet, a sandwich-type diaphragm 63 placed in the cylinder chamber 62, and a hydraulic drive (motor) 64 for actuating the diaphragm 63 such that suction and discharge occur alternately.

The outlet of the feeder 60 is communicated with the inlet of the diaphragm pump 61 by a line 15a such that the slurry is forced into the cylinder chamber 62 of the diaphragm pump 61 during the suction (admission) stroke of the diaphragm pump 61. A return pipe 65 extends from the line 15a to the raw material tank 10 to feed back the slurry to the tank 10 during the discharge stroke of the diaphragm pump 61.

A double-tube type heat exchanger 24 is provided on the slurry feed line 15. After the heat exchanger 24, the slurry line 15 connects to a circulation line 26 of a hydrothermal reaction tube 25.

The hydrothermal reaction tube 25 has a heat medium circulation line 27, on which are provided a pump 28 for causing the heat medium to circulate and a heater 29 for heating the heat medium.

The hydrothermal reactor 25 also has a double-tube structure such that the slurry flows in an inner tube 30, and the heat medium flows between the inner tube 30 and an outer tube 32.

The circulation line 26 connects the outlet of the inner tube 30 of the hydrothermal reactor 25 to the inlet of the same. A circulation pump 31 is provided on the circulation line 26. Upstream of the circulation pump 31, a line 33a is branched from the circulation line 26 to transfer part of dissolved matters to the heat exchanger 24. A dissolved matters line 33 extends from the heat exchanger 24 to an oxidization vessel 22.

On the dissolved matters line 33, provided are a trim cooler 34 and backing pressure regulation valve 35.

An oxidation agent feed line 36 connects to the oxidation vessel 22 for oxidation of the dissolved matters by deconstructing. A line 72 extends from the oxidation vessel 22 to a gas-liquid separator 23. A liquid discharge line 37 extends to the oxidation vessel 22 from the bottom of the gas-liquid separator 23 so that part of the oxidized dissolved matters is returned to the oxidation vessel 22. A pump 40 is provided on the liquid discharge line 37 for this returning.

A line 41 is branched from the liquid discharge line 37 and extends to a liquid disposal tank 14 to return a liquid-after-the-treatment to the liquid tank 14. On this branch line 41, provided are a trim cooler 42 and backing pressure regulation valve 43.

The gas-liquid separator 23 also has a gas discharge line 50, on which a condenser 38 and backing pressure regulation valve 52 are provided. A line 53 extends from the condenser 38 to the gas-liquid separator 23 to return liquid, resulting upon condensation in the condenser 38, to the gas-liquid separator 23.

The treating liquid tank 14 has a line 44 extending from its top to discharge dissolved/oxidized gas and another line 45 extending from the bottom for drain. The dissolved gas discharge line 44 has a deodorant device 46 including, for example, activated carbon. The drain line 45 has a branch line 47 with a pump 48 to make it available to return part of the sewage to the raw material tank 10 if necessary.

Gas generated in the raw material tank 10 is introduced to the exhaust gas line 44 via a line 49.

The trim coolers 34 and 42 and condenser 38 are fed a cold water "w" from respective cooling towers (not shown). After used in the cooling process in the trim coolers 34 and 42 and condenser 38, the water "w" returns to the cooling towers and air cooled. Then, the water "w" is supplied to the trim coolers and condenser again.

Now, an operation of the illustrated waste treating apparatus will be described.

First, the raw material (flora and fauna waste) 11 is fed into the tank 10, and the water is fed into the tank 10 from the water tank 12 via the line 18. The chemicals are also supplied to the tank 10 from the chemicals tank 13 via the line 20. In this way, the slurry is prepared in the tank 10. Then, the slurry is transmitted to the feed line 15 by the pump 16 and delivered to the hydrothermal reactor 25. The slurry is dissolved in the hydrothermal reactor 25. The dissolved substances transferred to the heat exchanger 24 heat exchanges with the slurry inside the heat exchanger 24 before the slurry enters the hydrothermal reactor 25.

In the hydrothermal reactor 25, the water contained in the slurry is subjected to a subcritical condition with high pressure and temperature (250° C. and 6 Mpa) so that the organic substances in the flora and fauna waste are dissolved to hydrocarbon, etc. In this hydrothermal reaction, the slurry is repeatedly circulated by the line 26 to insure a certain flow (moving) speed of the slurry. This promotes thermal transfer between the slurry and heat medium inside the hydrothermal reactor 25 and prevents carbonizing inside the pipes. The liquid chemicals such as sodium hydroxide facilitate dissolving of the slurry.

An amount of circulation in the line 26 may be determined or limited by an inner diameter of the inner tube 30, but in this particular embodiment the slurry flowing speed in the inner tube 30 is 2 to 3 m/sec.

The dissolved substances are then discharged to the heat exchanger 24 via the line 33a, as mentioned earlier. After heating the newly coming slurry in the heat exchanger 24, the dissolved substances are cooled in the trim cooler 34 and their pressure is reduced in the backing pressure regulation valve 35. Subsequently, the dissolved matters are transmitted to the oxidation vessel 22 such that combustible matters and remaining hydrocarbon, which is not reacted in the hydrothermal reactor 25, are burned for oxidization. The resulting matters proceed to the gas-liquid separator 23, and part of them is returned to the oxidation vessel 22 to keep flow (moving) speed inside the oxidation vessel.

Since the heat of the substances discharged from the hydrothermal reactor 25 is used to heat the slurry in the heat exchanger 24 (heat recovery), the slurry is already heated to a certain extent when it enters the hydrothermal reaction reactor 25 so that the heat medium heater 29 is required to generate less heat.

After the gas-liquid separator 23, the liquid proceeds into the line 41, is cooled in the trim cooler 42 and its pressure drops to the atmospheric pressure in the backing pressure regulation valve 43. Then, the liquid is disposed into the tank 14. On the other hand, the gas is guided to the condenser 38 via the line 50. Upon condensation, the condensed liquid component returns to the gas-liquid separator 23 whereas the gas component is introduced to the backing pressure regulation valve 52 to reduce its pressure. The gas component is then introduced to the tank 14.

A gaseous component in the tank 14 is admitted to the deodorant device 46 via the pipe 44 whereas a liquid component is drained to the sewage line 45.

As understood from the foregoing, as compared with the conventional arrangement employing supercritical pressure/temperature, the present invention uses moderated reaction temperature and pressure. Accordingly, slurry dissolving capability is deteriorated to a certain extent, i.e., capability of reducing COD (chemical oxygen demand) is lowered, but it is possible to reduce or eliminate a problem of corrosion of piping. Further, although the dissolving capability in the hydrothermal reactor itself is lowered, the oxidation vessel 22 performs the oxidation after the hydrothermal reaction. Therefore, as a whole, a sufficient dissolving is obtained.

The illustrated and described arrangement is disclosed in Japanese Patent Application No. 11-330000 filed on Nov. 19, 1999, the instant application claims priority of this Japanese patent Application, and the entire disclosure thereof is incorporated herein by reference.

What is claimed is:

1. An apparatus for treating flora and fauna waste comprising,
   a slurry preparation unit (10) for mixing the flora and fauna waste (11) with water into slurry;
   a pressurizing unit (16) for pressurizing the slurry to a subcritical pressure of water,
   a hydrothermal reaction unit (25, 26, 27) for heating the pressurized slurry to cause hydrothermal reaction in a subcritical condition thereby obtaining a dissolved waste, and
   an oxidization unit (22, 35, 36, 37) for oxidizing the dissolved waste from the hydrothermal reaction,
   wherein the hydrothermal reaction unit (25, 26, 27) is of a double-tube structure such that the slurry flows in an inner tube (30) and the heat medium flows in an outer tube (32),
   a circulation unit (26, 31) connected to both an outlet and an inlet of the inner tube (30) for circulating the slurry to the inner tube (30) repeatedly, and
   a heat medium circuit (27, 28, 29) for heating the slurry by a heat medium flowing between the inner tube (30) and the outer tube (32), and
   wherein the oxidization unit (22, 23, 35, 36, 37) includes,
   a backing pressure regulation valve (35) for depressurizing the dissolved waste from the hydrothermal reaction unit (25, 26, 27),
   an oxidization vessel (22) for oxidizing the dissolved waste with an oxidizing agent in a depressurized condition maintained by the backing pressure regulation valve (35), and
   an oxidizing agent supply line (36) for feeding the oxidizing agent into the dissolved waste in the oxidization vessel (22), and
   a gas-liquid separator (23) for receiving an oxidized waste from the oxidization vessel (22) and separating the oxidized waste into a liquid component and a gaseous component, and
   a return unit (37,40) for returning the liquid component separated by the gas-liquid separator (23) into the oxidization vessel (22).

2. The apparatus for treating flora and fauna waste with hydrothermal reaction according to claim 1, wherein:
   the slurry preparation unit (10) further includes a chemical feeding unit (13) for injecting chemicals into the flora and fauna waste.

3. The apparatus for treating flora and fauna waste with hydrothermal reaction according to claim 2, wherein:
   the chemicals include sodium hydroxide.

4. The apparatus for treating flora and fauna waste with hydrothermal reaction according to claim 1, wherein:
   the heat medium circuit (28, 28, 29) includes a heat medium circulation line (27) connected to both an outlet and an inlet of the outer tube (32) of the hydrothermal reaction unit (25) for circulating the heat medium,
   a heat medium pump (28) connected to the heat medium circulation line (27), and a heater (29) connected to the heat medium circulation line (27) for heating the heat medium.

5. The apparatus for treating flora and fauna waste with hydrothermal reaction according to claim 1, wherein:
   the circulation unit (26, 31) includes a circulation line (26) linking the outlet of the inner tube (30) with the inlet of the inner tube (30) of the hydrothermal reaction tube (25), and
   a circulation pump (31) connected to the circulation line (26), for circulating directly and repeatedly the slurry through the inner tube (30) of the hydrothermal tube (25).

6. The apparatus for treating flora and fauna waste with hydrothermal reaction according to claim 5, wherein:
   the hydrothermal reaction unit (25, 26, 27) further includes a heat exchanger (24) for heat exchange between the slurry directed to the hydrothermal reaction tube (25) and the dissolved waste from the hydrothermal reaction tube (25) directed into the oxidization unit (22, 23, 35, 37).

7. The apparatus for treating flora and fauna waste with hydrothermal reaction according to claim 6, wherein:
   the pressurizing unit (16) is comprised of a feeder (60) and a reciprocal pump (61), both of which feeder (60) and pump (61) are connected to the slurry supply line (15) which links the slurry preparation unit (10) with the circulation line (26) of the outlet side of the circulation pump (31), for moving the slurry from the slurry preparation unit (10) through the feeder (60) into the reciprocal pump (61) to pressurize the slurry to a subcritical pressure of water of 6 Mpa or more.

8. The apparatus for treating flora and fauna waste with hydrothermal reaction according to claim 7, wherein:
   the pressurizing unit (16) includes a diaphragm pump (61) connected to the slurry supply line,
   a feeder (61) for pushing the slurry into the diaphragm pump (61), and
   a return line (65) extending from between the diaphragm pump (61) and the feeder (60) to the slurry preparation unit (10) for returning part of the slurry to the slurry preparation unit (10) when the diaphragm pump compresses the slurry.

9. The apparatus for treating flora and fauna waste with hydrothermal reaction according to claim 6, wherein:
   the pressurizing unit (16) includes a diaphragm pump (61),
   a feeder (60) for pushing the slurry from the slurry preparation unit (10) into the diaphragm pump (61), and
   a re-circulating line (65) extending from between the diaphragm pump (61) and the feeder (60), for returning part of the slurry to the slurry preparation unit (10) when the diaphragm pump compresses the slurry.

10. The apparatus for treating flora and fauna waste with hydrothermal reaction according to claim 6, wherein:
    the backing pressure regulation valve (35) is located between the heat exchanger (24) and the oxidization vessel (22).

11. The apparatus for treating flora and fauna waste with hydrothermal reaction according to claim 5, wherein:
    the slurry runs through the inner tube (30) at 2 to 3 meters per second.

12. The apparatus for treating flora and fauna waste with hydrothermal reaction according to claim 1, wherein:
    the gas-liquid separator (23), for receiving the oxidized flora and fauna waste from the oxidization vessel (22)

and separating the oxidized flora and fauna waste into a liquid component and a gaseous component, has a return line (37) for returning part of the liquid component from the gas-liquid separator (23) into the oxidization vessel (22), and a disposal line (41) for supplying a rest of the liquid component to a liquid disposal tank (14).

13. The apparatus for treating flora and fauna waste with hydrothermal reaction according to claim 12, wherein:

the gas-liquid separator (23) has a gas discharge line (50), the gas discharge line (50) has a condenser (38), and the condenser (38) condenses a vaporous component of the received gaseous component into a liquidized component, has a second return line (53) for returning the second liquid component to the gas-liquid separator (23), and has a line introducing a gaseous component separated from the liquidized component into the liquid disposal tank (14), and the liquid disposal tank (14) has an associated activated carbon deodorant device (46) for deodorizing a gaseous component within the deodorant device (46).

14. The apparatus for treating flora and fauna waste with hydrothermal reaction according to claim 13, wherein:

the liquid disposal tank (14) has a disposal line (45) for disposing the liquid waste component outside of the apparatus, and a return unit (47, 48) for returning a rest of the liquidized component to the slurry preparation unit (10).

* * * * *